United States Patent
Ni et al.

(10) Patent No.: US 12,345,610 B1
(45) Date of Patent: Jul. 1, 2025

(54) METHOD FOR TESTING AND EVALUATING LATERAL STIFFNESS OF SMALL BOX GIRDER BRIDGE

(71) Applicants: RESEARCH INSTITUTE OF HIGHWAY MINISTRY OF TRANSPORT, Beijing (CN); DALIAN UNIVERSITY OF TECHNOLOGY, Dalian (CN)

(72) Inventors: Yingsheng Ni, Beijing (CN); Donghui Yang, Dalian (CN); Chunxia Song, Beijing (CN); Xuefeng Zhang, Beijing (CN); Yongchang Zhang, Dalian (CN)

(73) Assignee: RESEARCH INSTITUTE OF HIGHWAY MINISTRY OF TRANSPORT & DALIAN UNIVERSITY OF TECHNOLOGY (CN)

( * ) Notice: Subject to any disclaimer, the term of this patent is extended or adjusted under 35 U.S.C. 154(b) by 0 days.

(21) Appl. No.: 19/174,420

(22) Filed: Apr. 9, 2025

(30) Foreign Application Priority Data

Jun. 27, 2024 (CN) .......................... 202410844373.0

(51) Int. Cl.
*G01M 5/00* (2006.01)

(52) U.S. Cl.
CPC ........ *G01M 5/0008* (2013.01); *G01M 5/0041* (2013.01)

(58) Field of Classification Search
CPC ............. G01M 5/0058; G01M 5/0066; G01M 5/0091; F41B 6/006
See application file for complete search history.

(56) References Cited

FOREIGN PATENT DOCUMENTS

| | | |
|---|---|---|
| CN | 111692985 A | 9/2020 |
| CN | 112945490 A | 6/2021 |
| CN | 113283130 A | 8/2021 |
| CN | 114021405 A | 2/2022 |
| CN | 115713020 A | 2/2023 |
| CN | 116793620 A | 9/2023 |
| CN | 117990509 A | 5/2024 |
| RU | 2002116777 A | 1/2004 |

OTHER PUBLICATIONS

Search Report in Chinese Patent Application No. 2024108443730, mailed on Dec. 9, 2024.

(Continued)

*Primary Examiner* — Lee E Rodak
*Assistant Examiner* — Sangkyung Lee
(74) *Attorney, Agent, or Firm* — Schmeiser, Olsen & Watts LLP

(57) ABSTRACT

A method for testing and evaluating lateral stiffness of small box girder bridges is provided. The method includes the following steps: a deflection sensor collects a deflection value of a measuring point based on a loading process of a loading vehicle; based on the deflection value of the measuring point and an information matrix of the loading vehicle, an influence line of longitudinal bridge deflection of each measuring point is obtained; based on the influence line of longitudinal bridge deflection, the influence line of lateral bridge deflection of small box girder bridge is obtained by interpolation method; and based on the influence line of lateral deflection of small box girder bridge, a stiffness evaluation result is obtained.

4 Claims, 14 Drawing Sheets

(56) References Cited

OTHER PUBLICATIONS

Notification to Grant Patent Right for Invention for Chinese Patent Application No. 202410844373 mailed on Dec. 29, 2024.
Xie Hailong, "Research on Finite Element Model Updating Bridges Based on Deflection Influence Lines" Shanxi Communications Technology, No. 01, Aug. 15, 2017.
Ma Shujun, "Research on the Load-Bearing Capacity of Prestressed Concrete Small Box Girder Bridges Based on Load Testing" Transport World, Jun. 10, 2023.
Ni Hongjie and Ni Yingsheng, "Comparison of analysis methods for box structure bridges" Urban roads and bridges and flood control, Apr. 30, 2015.

METHOD FOR TESTING AND EVALUATING LATERAL STIFFNESS OF SMALL BOX GIRDER BRIDGE

CROSS-REFERENCE TO RELATED APPLICATIONS

This application claims priority to Chinese Patent Application No. CN202410844373.0, filed on Jun. 27, 2024, the contents of which are hereby incorporated by reference.

TECHNICAL FIELD

The present disclosure belongs to the technical field of bridge structure safety detection, in particular to a method for testing and evaluating lateral stiffness of small box girder bridges.

BACKGROUND

In bridge construction, there are a large number of small and medium-span bridges, and the small box girder bridge, as one of the main types of small and medium-span bridges, has been developed rapidly and widely applied in China and abroad in recent years. As a key hub in transportation, the bridge structure plays a vital role, but due to an aging of internal materials or an influence of external loads, a bridge will be damaged to varying degrees, resulting in the reduction of bridge stiffness. In daily operation, a box girder bridge will be deformed to some extent and a beam body will be cracked in many places. The reduction of stiffness directly affects a bearing capacity, stability and service life of the bridge. It is of great practical significance and social value to detect parts where stiffness reduction occurs in time to evaluate the bearing capacity of a subsequent bearing and maintain treatment tools.

At present, when obtaining stiffness, a testing method is mainly focused on a distribution law of bending stiffness in a longitudinal direction, but pays little attention to a change and distribution of stiffness in a lateral direction. Lateral stiffness is very important to the stability of the whole bridge structure. Sufficient lateral stiffness is able to effectively resist a lateral load and a wind load, maintain the stability of the bridge structure, reduce structural deformation and vibration, and good lateral stiffness is able to ensure the uniform distribution of internal load of the bridge structure and reduce local stress concentration, thus ensuring a safe operation of the bridge.

Detection methods for the stiffness of small box girder bridges mainly consist of the dynamic method and the static method. The dynamic response and static response of the bridge are obtained by testing instruments, and the bridge stiffness is evaluated by using these data combined with data processing algorithm and formula calculation. By designing special measuring points, an influence line of longitudinal bridge deflection of the bridge is obtained by vehicle load, and an influence line of lateral bridge deflection of the bridge is fitted by interpolation algorithm, so the position of stiffness damage in a lateral section of the bridge may be determined by a difference of the influence line of lateral bridge deflections of the measuring points at different time intervals. It has a good application prospect in bridge performance evaluation. Therefore, it is of great significance to study a method for measuring and evaluating the lateral stiffness of small box girder bridges.

SUMMARY

In order to solve the technical problems above, the disclosure provides a method for testing and evaluating lateral stiffness of small box girder bridge, so as to solve the problems existing in the prior art.

In order to achieve the above objective, the disclosure provides a method for testing and evaluating lateral stiffness of small box girder bridges, which include the following steps:

collecting the deflection value of the measuring point by a deflection sensor based on a loading process of a loading vehicle;

obtaining the influence line of longitudinal bridge deflection of each measuring point based on the deflection value of the measuring point and an information matrix of the loading vehicle;

obtaining the influence line of lateral bridge deflection of the small box girder bridge by interpolation method based on the influence line of longitudinal bridge deflection; and carrying out stiffness evaluation based on the influence line of lateral bridge deflection of the small box girder bridge to obtain a stiffness evaluation result.

Optionally, before collecting the deflection value of the measuring point, a layout of the deflection sensor is also included, and a layout process of the deflection sensor includes:

at mid-span section of the bridge, two deflection measuring points are arranged on a bottom surface of each small box beam;

at quarter-span section of the bridge, one deflection measuring point is arranged on the bottom surface of each small box beam;

at eighth span section of the bridge, one deflection measuring point is arranged on the bottom surface of each small box beam;

in a section at a bearing of the bridge, two deflection measuring points are respectively arranged on the bottom surface of each small box beam;

at the same time, a radar speedometer is arranged at the quarter-span and the mid-span of the bridge.

Optionally, a process of collecting data based on a loading process sensor of the loading vehicle includes:

the loading vehicle moves from one end edge of the bridge to another end edge along a longitudinal bridge direction to complete a longitudinal bridge direction loading;

then a loading position moves to another end along a lateral bridge, and after each movement, the loading position continues to move along the longitudinal bridge direction until it reaches an edge of the bridge in the longitudinal bridge direction to complete a secondary longitudinal bridge loading;

when the secondary longitudinal bridge loading is completed, readings of the radar speedometer at the quarter-span and the mid-span of the bridge are observed when the difference between the readings of the speedometer at the quarter-span and the mid-span is within 5%, the data collected by the sensor is valid.

Optionally, Tikhonov regularization method is widely applied to identify the influence line of longitudinal bridge deflection; among them, and an expression of the influence line of longitudinal bridge deflection identification is:

$$P=\mathrm{argmin}[\|R-CP\|_2^2+\lambda\|KP\|_2^2]$$

where P is an influence coefficient vector of influence line of longitudinal bridge deflection, R is a deflection response vector collected by deflection sensor, C is an information matrix of loading vehicle, $\lambda$ is a regularization coefficient, and K is a regularization matrix.

Optionally, a process of obtaining the influence line of lateral bridge deflection of the small box girder bridge includes:

two deflection influence lines at a same lateral position are obtained based on a primary longitudinal bridge loading and a secondary longitudinal bridge loading, and a final longitudinal bridge direction deflection influence line of a current measuring point is obtained by averaging the two deflection influence lines;

the influence coefficients of the influence line of longitudinal bridge deflections of the two deflection measuring points of the mid-span section and the bearing section of the bridge are averaged respectively to obtain the influence line of longitudinal bridge deflections of the mid-span section and the bearing section;

based on a fitting of influence line of longitudinal bridge deflections of bearing section, eighth span section, quarter-span section and mid-span section, the influence line of lateral bridge deflection of small box girder bridge is obtained.

Optionally, the process of stiffness evaluation includes:

based on the influence line of lateral deflection of small box girder bridge fitted for a first time, a reference influence line is obtained;

after half a year's interval, a test cross section is fitted by loading test again to obtain a current influence line of lateral bridge deflection;

the deflection influence coefficients difference of each measuring point is obtained based on the reference influence line and the current influence line of lateral bridge deflection;

when the difference of deflection influence coefficients on both sides of a fixed abscissa changes between plus-minus alternately, a stiffness decreases.

Optionally, a criterion for judging the stiffness decrease also includes that a slope of the deflection influence line of the current measuring point changes more than rest parts on both sides of the stiffness decrease area.

Optionally, the expression of the difference of deflection influence coefficients of each measuring point on a cross section is:

$$\begin{cases} \Delta s_1(x_i) = s_1(x_i) - s_1(x_i)_{base}(i = 1, 2, \ldots m) \\ \Delta s_2(x_i) = s_1(x_i) - s_1(x_i)_{base}(i = 1, 2, \ldots m) \\ \vdots \\ \Delta s_n(x_i) = s_n(x_i) - s_n(x_i)_{base}(i = 1, 2, \ldots m) \end{cases}$$

where i is a lateral loading point of the same section, m is a number of lateral loading point, $x_i$ is a position coordinates of a lateral loading point i of the same section, $s_1(x_i)_{base}$ is an expression of reference influence line of lateral bridge deflection of the measuring point on a first test section fitted under the first test, $s_1(x_i)$ is an expression of influence line of lateral bridge deflection of the measuring point on the first test section fitted after half a year, $\Delta s_1(x_i)$ represents a difference function of deflection influence coefficients of the measuring point at different lateral positions on the first test section, and n represents a number of test sections.

Compared with the prior art, the disclosure has the following advantages and technical effects.

According to the disclosure, the sensors are symmetrically arranged at a bottom of a cross section beam and a vehicle load is loaded twice in a same lane at a same speed, so that an accuracy of an influence line data is improved, the traffic is less negatively affected in a test process, and no new damage is caused to the bridge;

The influence line of lateral bridge deflection fitting method provided by the disclosure has strict theoretical basis, and a response relation at the lateral position may be obtained through the influence line of longitudinal bridge deflection, so a rigidity decrease in the lateral direction may be located, and the data obtained under a special sensor layout method and vehicle loading design scheme may ensure that a structure is of improved accuracy.

BRIEF DESCRIPTION OF THE DRAWINGS

The attached drawings, which constitute a part of this disclosure, are widely applied to provide a further understanding of this disclosure. The illustrative examples and descriptions of this disclosure are widely applied to explain this disclosure, and do not constitute an improper limitation of this disclosure. In the attached drawings.

DETAILED DESCRIPTION OF THE EMBODIMENTS

It should be noted that embodiments in this disclosure and features in the embodiments can be combined with each other without conflict. The present disclosure will be described in detail with reference to the attached drawings and embodiments.

It should be noted that steps shown in a flowchart of the drawings can be executed in a computer system such as a set of computer-executable instructions, and although a logical order is shown in the flowchart, in some cases, the steps shown or described can be executed in a different order from here.

Embodiment 1

Figure 1:
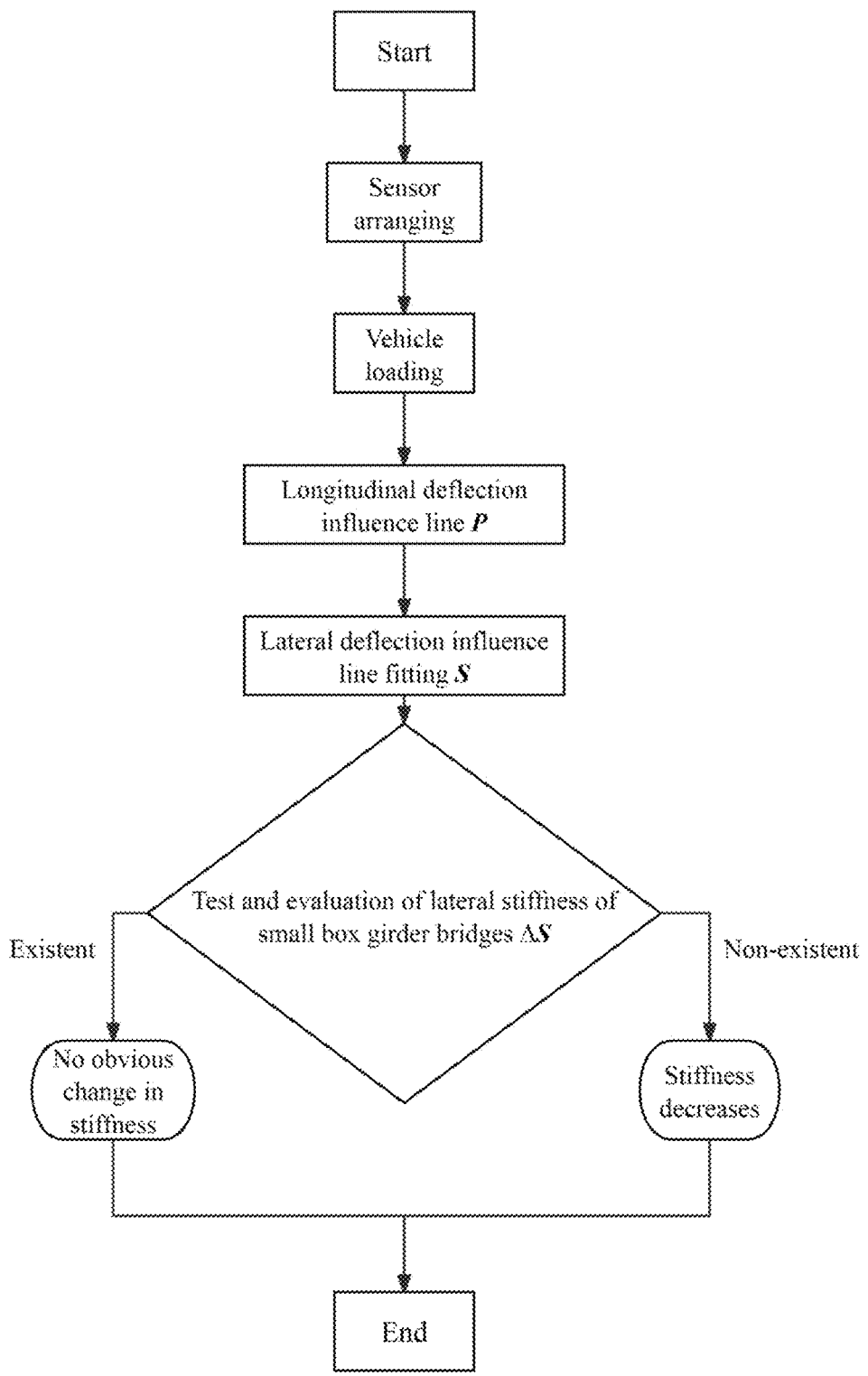
FIG. 1 is a flowchart of a method for testing and evaluating lateral stiffness of small box girder bridge according to an embodiment of the disclosure.

As shown in FIG. 1, this embodiment provides a method for testing and evaluating lateral stiffness of small box girder bridge. According to this method, displacement sensors are arranged at designed positions, so loading vehicle may load a bridge according to a specific scheme, and a corresponding deflection response data can be obtained to solve an influence line of longitudinal bridge deflection. Then, cubic spline difference formula is introduced to fit an influence line of lateral bridge deflection of a small box girder bridge, and a lateral stiffness of the small box girder bridge can be evaluated by using a difference between the influence line of lateral bridge deflection obtained at different times and a reference influence line. This method is simple to operate, a measured data type is single, and a data transmission error is small, and is suitable for a detection of lateral stiffness damage in small box girder bridges and can realize a qualitative evaluation of lateral stiffness. The method specifically includes the following steps: a deflection sensor collects a deflection value of a measuring point based on a loading process of a loading vehicle; based on the deflection value of the measuring point and the information matrix of the loading vehicle, the influence line of longitudinal bridge deflection of each measuring point is obtained; based on the influence line of longitudinal deflection, the influence line of lateral deflection of small box girder bridge is obtained by interpolation method; based on the influence line of lateral deflection of small box girder bridge, the stiffness evaluation results are obtained.

Figure 2:
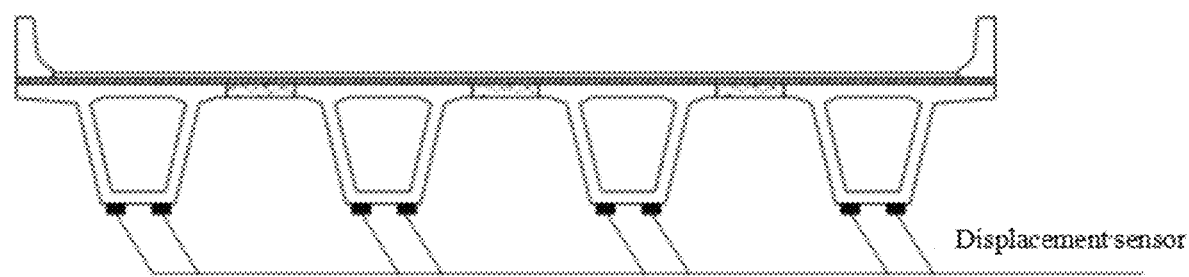
FIG. 2 is a schematic diagram of a position of displacement sensors in a mid-span section and a bearing section according to an embodiment of the disclosure.
Figure 3:
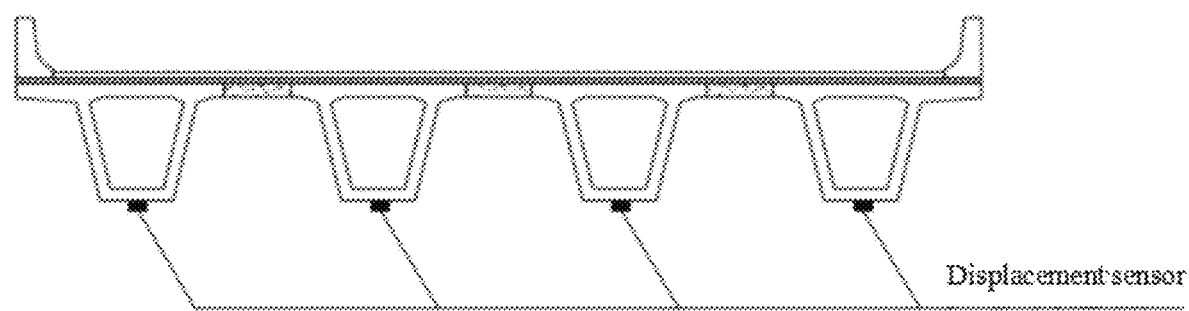
FIG. 3 is a schematic diagram of the position of displacement sensors with quarter-span and eighth span section according to an embodiment of the disclosure.

Before collecting the deflection value of the measuring point, it also includes a layout of the deflection sensor, and the layout process of the deflection sensor includes step 1:
Step 1, Sensor Layout Method of Small Box Girder Bridge For the collection of deflection data of small box girder bridge, deflection sensors are widely applied, and mid-span section, quarter-span section, eighth span section and bearing section of the bridge are taken as test sections. At the mid-span section of the bridge, two deflection measuring points are respectively arranged on a bottom surface of each small box beam, and the measuring points are symmetrically distributed at a bottom midline of each small box beam, and a longitudinal positions of the measuring points at the mid-span section are consistent; at the quarter-span section of the bridge, a deflection measuring point is arranged on the bottom surface of each small box beam, and the measuring point is located at the bottom midline of each small box beam, and the longitudinal positions of the measuring points are consistent; at the eighth span section of the bridge, a deflection measuring point is arranged at the bottom of each small box girder, and the measuring point is located at the bottom midline of each small box girder, and the longitudinal position of the measuring point is kept the same; in the bearing section of the bridge, two deflection measuring points are respectively arranged on the bottom surface of each small box beam, and the measuring points are symmetrically distributed at the bottom midline of each small box beam, the longitudinal positions of the measuring points are consistent with each other, and the lateral positions are consistent with the measuring points at the mid-span section. The layout positions of bridge displacement sensors are shown in FIG. 2 and FIG. 3. At the same time, radar speedometers are arranged at the quarter-span and the mid-span of the bridge to record a driving speed of vehicles when they pass in turn.

Figure 5:
FIG. 5 is a schematic diagram of a longitudinal bridge loading position according to an embodiment of the disclosure.
Figure 6:
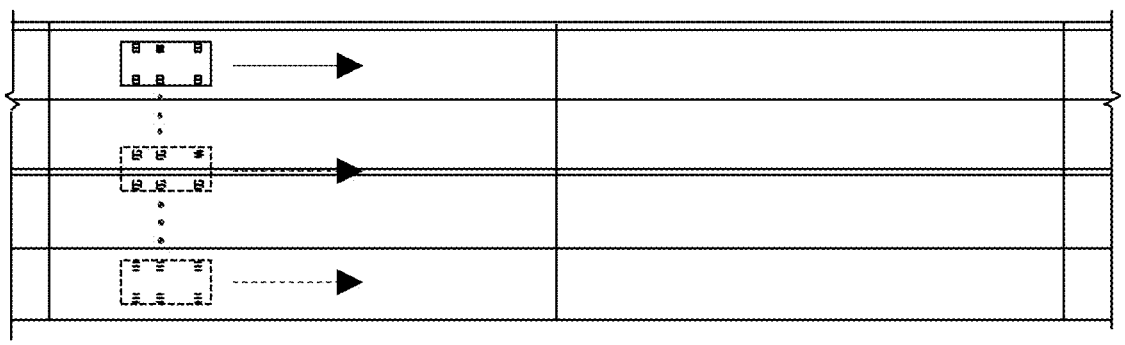
FIG. 6 is a schematic diagram of a lateral bridge loading position according to an embodiment of the disclosure.

A process of collecting data by the loading process sensor of the loading vehicle includes: the loading vehicle moves from one end edge of the bridge to another end edge along the longitudinal bridge direction to complete a longitudinal bridge direction loading; then the loading position moves to another end along a lateral bridge, and after each movement, the loading position continues to move along the longitudinal bridge direction until it reaches an edge of the bridge in the longitudinal bridge direction to complete a secondary longitudinal bridge loading; when the secondary longitudinal bridge loading is completed, readings of a radar speedometer at the quarter-span and mid-span of the bridge are observed, when the difference between the readings of the radar speedometer at the quarter-span and mid-span is within 5%, the data collected by the sensor is valid. The specific implementation process includes step 2:
Step 2, Vehicle Loading of Small Box Girder Bridge Three-axle truck is selected as the loading vehicle. At a beginning of the test, the vehicle starts to load from a left end near the edge of a road, gradually moves to another end of the bridge along the longitudinal bridge, and ends at a right edge. After, the loading position moves to another end along the lateral bridge, and a distance s of each lateral movement is half of a wheel track, after each movement, the vehicle continues to move to another end of the bridge gradually along the longitudinal bridge until it reaches the right edge. In the process of loading, the same horizontal position is loaded twice. The longitudinal loading position of the vehicle is shown in FIG. 5 and FIG. 6. Every time a load is completed, the interval is 5 min before starting a next load. During the loading process, observe an indicator of the speedometer, if the difference between the indicator of the speedometer at the mid-span and the quarter-span is within 5%, the data obtained by the sensor can be widely applied as valid data; when the difference between the indicator of the speedometer at the mid-span and the quarter-span is more than 5%, it needs to be reloaded.
Step 3, Identifying the Influence Line of Longitudinal Deflection of Small Box Girder Bridge During a whole loading process, deflection values of the mid-span section, quarter-span section, eighth span section and bearing section are collected after each loading. Defining each axle load of the loading vehicle as $M_i$, when the loading vehicle passes through the bridge, the deflection sensor at a corresponding measuring point will collect a series of responses R, and a response equation can be written in matrix form as follows:

$$R=CP \quad (1)$$

where, R is a deflection response vector collected by the deflection sensor, P is an influence coefficient vector of the influence line of longitudinal bridge deflection, C is an information matrix of the loading vehicle, and the form of C is as follows:

$$C = \begin{bmatrix} M_1 & 0 & \ldots & M_k & & & \\ & M_1 & 0 & \ldots & M_k & & \\ & & \ddots & \ddots & \ddots & M_k & \\ & & & \ddots & \ddots & \ddots & M_k \\ & & & & M_1 & 0 & \ldots & M_k \end{bmatrix}_{a \times b}$$

M is an axle load of the vehicle, k is a number of axles, b is a number of bridge response collection points, and a is a number of influence line coefficients. For the sensor response equation, the vehicle load matrix is known, and a structural response vector may be measured by installing sensors. However, the structural response vector R measured in real time is usually subject to fluctuations caused by factors such as dynamic impact, rough road surface, environmental noise and measurement error. There will be big errors in direct solution, so an existence and stability of a solution of an equation are satisfied by limiting a solution space, and Tikhonov regularization method is widely applied to identify the influence line, and its expression is as follows:

$$P = \arg\min[\|R-CP\|_2^2 + \lambda\|KP\|_2^2] \quad (2)$$

where P is an influence coefficient vector of the influence line of longitudinal bridge deflection, R is a deflection response vector collected by deflection sensor, C is an information matrix of loading vehicle, $\lambda$ is a regularization coefficient, and K is a regularization matrix.

The influence coefficient vector P, minimizing a sum of squares of two norms is selected as an optimal solution of a complete influence line equation.

A process of obtaining the influence line of lateral bridge deflection of small box girder bridge includes: two deflection influence lines at the same lateral position are obtained based on primary longitudinal bridge loading and secondary longitudinal bridge loading, and two deflection influence lines are averaged to obtain a final influence line of longitudinal bridge deflection of the current measuring point; the influence coefficients of the influence line of longitudinal bridge deflections of the two deflection measuring points of the mid-span section and the bearing section of the bridge are averaged respectively to obtain the influence line of longitudinal bridge deflections of the mid-span section and the bearing section; the influence line of lateral bridge deflection of small box girder bridge is obtained by fitting the influence line of longitudinal bridge deflection of the bearing section, the eighth span section, the quarter-span section and the mid-span section. The specific implementation process includes step 4:

Step 4, Fitting the Influence Line of Lateral Deflection of Small Box Girder Bridge The influence lines of longitudinal deflection of each measuring point are arranged.

Firstly, for a certain measuring point, two longitudinal bridge loading tests are carried out at the same lateral position, and the influence coefficients of two deflection influence lines obtained at the same lateral position is averaged as the final influence line of longitudinal bridge deflection of the measuring point.

Then, there are two deflection measuring points on the bottom of each small box beam in the mid-span section and the bearing section, and the deflection influence line of the two deflection measuring points is averaged to the influence coefficients, and the deflection influence line at the middle line of the beam bottom is fitted. In this way, there is only one influence line of longitudinal bridge deflection under the load of each lane for the section at the bearing section, the eighth span section, the quarter-span section and the mid-span section.

Finally, according to the test section, there are different longitudinal influence lines at the bottom of each beam, and the longitudinal position coordinates of the influence lines are the same, and the influence coefficients are different. The influence coefficients of the influence line of a measuring point are recorded at the same section. The influence line of lateral deflection of small box girder bridge is fitted by interpolation method, and an expression of influence line of lateral bridge deflection of the same measuring point at different lateral positions is fitted by introducing cubic spline interpolation formula.

A process of stiffness evaluation includes: the reference influence lines are obtaining based on the first fitted influence line of lateral bridge deflection of small box girder bridges; after half a year's interval, a test cross section is fitted by loading test again to obtain a current influence line of lateral bridge deflection; based on the reference influence line and the current influence line of lateral bridge deflection, a deflection influence coefficient difference of each measuring point is obtained; when the difference of deflection influence coefficients on both sides of the fixed abscissa changes alternately, the stiffness decreases. The specific implementation process includes step 5:

Step 5, Stiffness Evaluation Based on the Influence Line of Lateral Deflection of Small Box Girder Bridge According to a fitted influence line of lateral deflection of measuring points, a state evaluation of lateral stiffness of small box girder bridges is carried out. For each measuring point on a test cross section, based on the influence line of lateral bridge deflection fitted by a first test, a loading test is carried out every half a year, and the influence line of lateral bridge deflection fitted by the measuring point is different from a first reference influence line, so as to obtain a function with lateral coordinate x as an independent variable and deflection influence coefficients difference $\Delta s_n(x_i)$ as a dependent variable, then, an image is drawn in MATLAB program, and the deflection influence coefficients difference function of each measuring point on the cross section is as formula 3:

$$\begin{cases} \Delta s_1(x_i) = s_1(x_i) - s_1(x_i)_{base}(i = 1, 2, \ldots m) \\ \Delta s_2(x_i) = s_1(x_i) - s_1(x_i)_{base}(i = 1, 2, \ldots m) \\ \quad \vdots \\ \Delta s_n(x_i) = s_n(x_i) - s_n(x_i)_{base}(i = 1, 2, \ldots m) \end{cases}$$

where i is a lateral loading point of the same section, m is a number of lateral loading point, $x_i$ is a position coordinates of a lateral loading point i of the same section, $s_1(x_i)_{base}$ is an expression of a reference influence line of lateral bridge deflection of the measuring point on a first test section fitted under the first test, $s_i(x_i)$ is an expression of the influence line of lateral bridge deflection of the measuring point on the first test section fitted after half a year, $\Delta s_1(x_i)$ represents a difference function of deflection influence coefficients of the measuring point at different lateral positions on the first test section, and n represents a number of test sections.

Judging the decrease of stiffness is carried out by observing the difference of deflection influence coefficients of each measuring point on the test section. When the difference of deflection influence coefficients on both sides of a fixed abscissa changes alternately, it shows that the stiffness near the lateral position has decreased. In addition, a slope of the deflection influence line of the measuring point on both sides of the stiffness reduction area changes more than the rest.

Based on the above specific implementation process, this embodiment uses a numerical example to calculate a test situation of a full bridge test.

Figure 4:
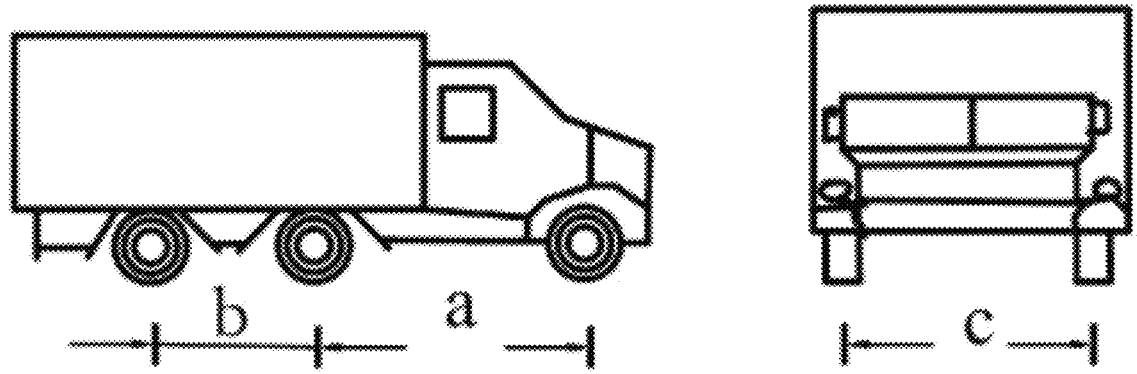
FIG. 4 is a simulated loading vehicle according to an embodiment of the disclosure.
Figure 7:
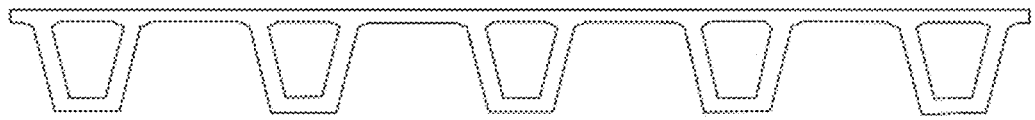
FIG. 7 is a front view of an assembled small box girder bridge according to an embodiment of the disclosure.
Figure 8:
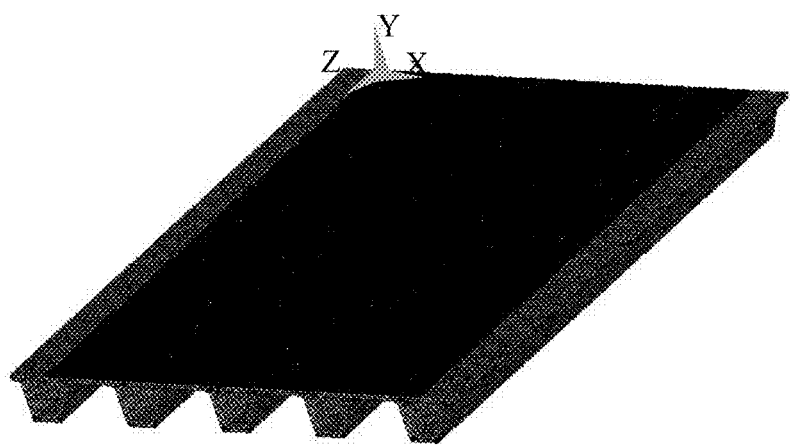
FIG. 8 is a side view of the assembled small box girder bridge according to an embodiment of the disclosure.

In this numerical example, a 30 m-span assembled small box girder bridge is simulated, a model of assembled small box girder bridge consists of five main girders, which are named as No. 1-5 main girder and No. 1-4 hinge joint respectively from left to right. Assuming a mass distribution of each girder is consistent, a girder section and bridge model are shown in FIG. 7 and FIG. 8, where FIG. 7 is a front view and FIG. 8 is a side view. A size of the loading vehicle is shown in FIG. 4, and it is loaded according to the loading process described in Step 2.

Figure 9:
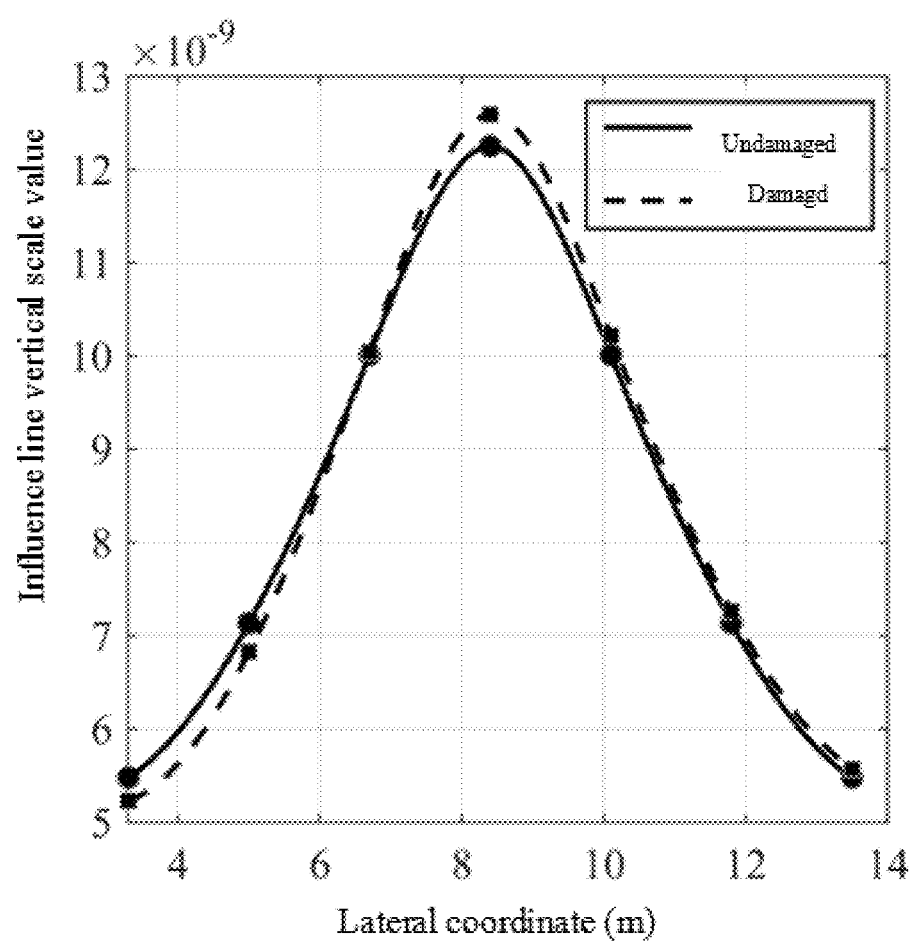
FIG. 9 is a schematic diagram of an influence line of a lateral deflection of a bottom of No. 3 beam in a mid-span under working condition 1.
Figure 10:
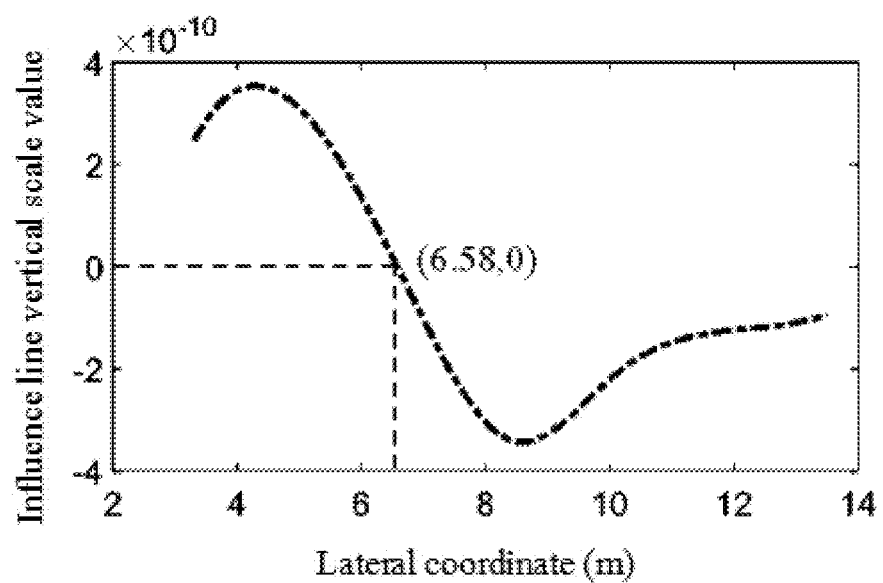
FIG. 10 is a schematic diagram of the difference of an influence coefficient of the influence line of lateral bridge deflection at the bottom of No. 3 beam in a front and rear spans of the beam with stiffness damage under working condition 1.
Figure 11:
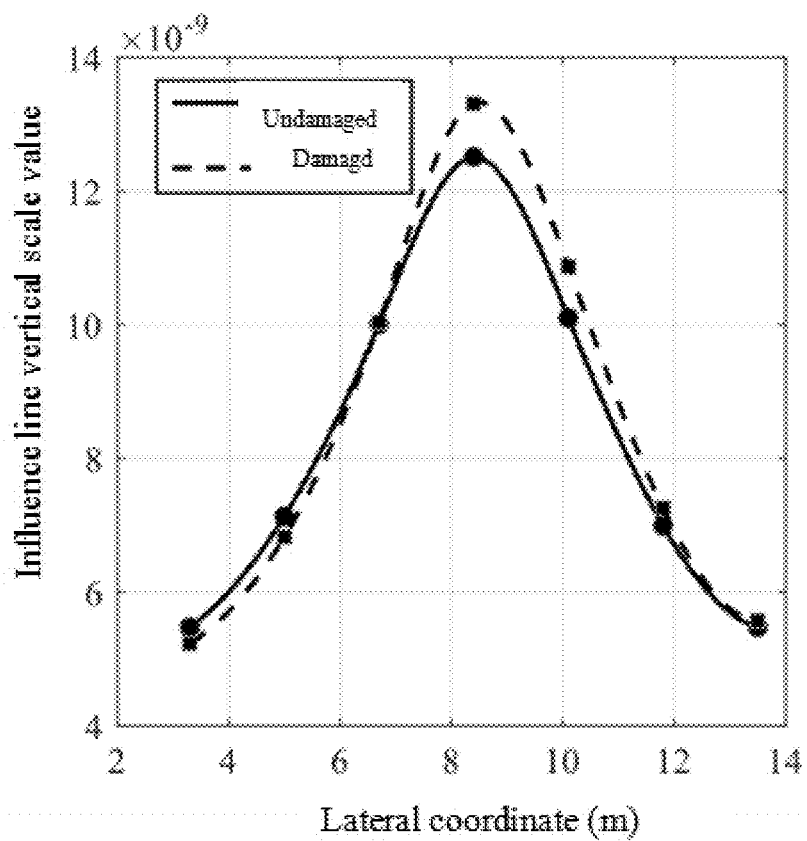
FIG. 11 is a schematic diagram of the influence line of the lateral deflection of the bottom of No. 3 beam in a mid-span under working condition 2.
Figure 12:
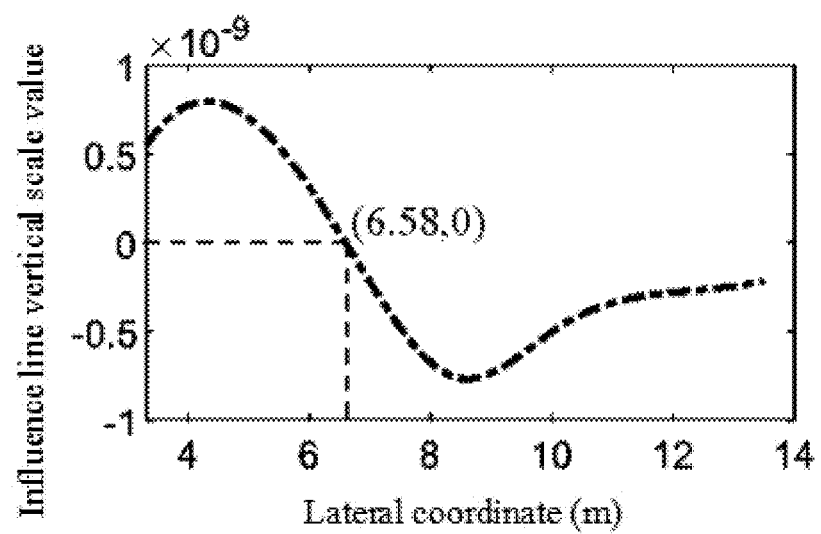
FIG. 12 is a schematic diagram of the difference of the influence coefficient of the influence line of lateral bridge deflection at the bottom of No. 3 beam in the front and rear spans of the beam with stiffness damage under working condition 2.

In this calculation, the stiffness reduction of the small box girder bridge is set to various working conditions, taking the mid-span section as an example, the stiffness reduction of the section is 25%, 35% and 45% respectively, as shown in Table 1. These working conditions are simulated in finite element method, and loaded and calculated according to above steps, FIG. 9 is a schematic diagram of an influence line of a lateral deflection of a bottom of No. 3 beam in a mid-span under working condition 1; FIG. 10 is a schematic diagram of the difference of an influence coefficient of the influence line of lateral bridge deflection at the bottom of No. 3 beam in a front and rear spans of the beam with stiffness damage under working condition 1; FIG. 11 is a schematic diagram of the influence line of the lateral deflection of the bottom of No. 3 beam in a mid-span under working condition 2; FIG. 12 is a schematic diagram of the difference of the influence coefficients of the influence line of lateral bridge deflections at the bottom of No. 3 beam in the front and rear spans of the beam with stiffness damage under working condition 2.

TABLE 1

| Measuring point position | Working condition | Reduction position | Degree of reduction |
| --- | --- | --- | --- |
| Mid-span No.3 main beam | 1 | Mid-span No.2 hinge joint | 25% |
| Mid-span No.3 main beam | 2 | Mid-span No.2 main beam | 35% |
| Mid-span No.4 main beam | 3 | Mid-span No.3 main beam | 45% |

Figure 13:
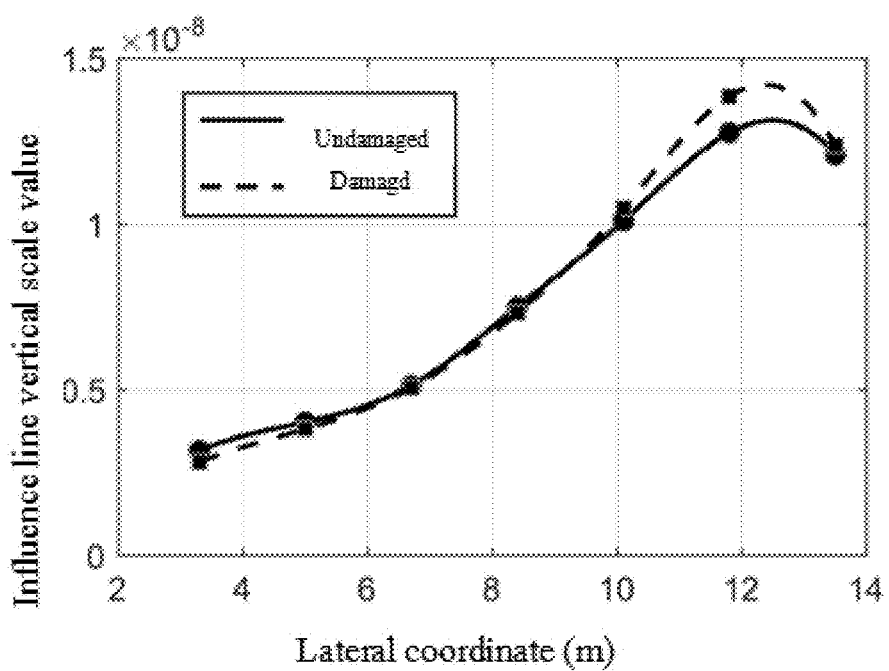
FIG. 13 is a schematic diagram of the influence line of the lateral deflection of a bottom of No. 4 beam in a mid-span under working condition 3.
Figure 14:
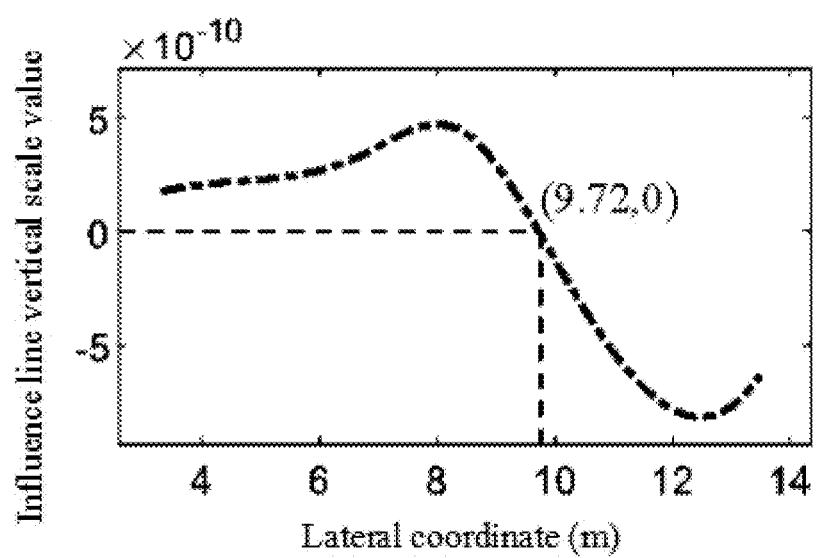
FIG. 14 is a schematic diagram of the difference of the influence coefficient of the influence line of lateral bridge deflection at the bottom of No. 4 beam in the front and rear spans of the beam with stiffness damage under working condition 3.

In an evaluation of lateral stiffness of small box girder bridge, it can be seen from FIG. 10 that the front and rear deflection influence lines at the bottom of No. 3 beam intersect at the lateral coordinate of 6.58, and the difference of deflection influence coefficients on both sides at the abscissa of 6.58 changes alternately, indicating stiffness damage occurs at this position, which is very close to the abscissa of the position where stiffness damage occurs at No. 2 hinge joint in the mid-span of working condition 1; from FIG. 12, it can be seen the front and rear deflection influence lines at the bottom of No. 3 beam intersect at the lateral coordinate of 6.58, and the difference of deflection influence coefficients on both sides at the lateral coordinate of 6.58 changes alternately, and stiffness damage occurs at this position. Compared with FIG. 10, the stiffness damage position is the same, the damage degree is different, and the difference of influence coefficients is larger, which is consistent with the working condition 2; FIG. 13 is a schematic diagram of the influence line of the lateral deflection of a bottom of No. 4 beam in a mid-span under working condition 3; FIG. 14 is a schematic diagram of the difference of the influence coefficients of the influence line of lateral bridge deflections at the bottom of No. 4 beam in the front and rear spans of the beam with stiffness damage under working condition 3, as can be seen from FIG. 14, the front and rear deflection influence lines at the bottom of No. 4 beam intersect at the lateral coordinate of 9.72, and the deflection influence coefficients difference between the two sides at the abscissa of 9.72 changes alternately, and stiffness damage occurs at this position, which is consistent with the conditions in working condition 3, compared with FIG. 10 and FIG. 12, it can be seen that whether stiffness damage occurs in the lateral bridge direction can be judged by the above methods under different measuring points.

The above is only the preferred embodiment of this disclosure, but the protection scope of this disclosure is not limited to this. Any change or replacement that can be easily thought of by a person familiar with this technical field within the technical scope disclosed in this disclosure should be included in the protection scope of this disclosure. Therefore, the protection scope of this disclosure should be based on the protection scope of the claims.

What is claimed is:

1. A method for testing and evaluating lateral stiffness of small box girder bridges, comprising following steps:
   collecting a deflection value of a measuring point based on a loading process of a loading vehicle by a deflection sensor;
   obtaining an influence line of longitudinal bridge deflection of each measuring point based on the deflection value of the measuring point and an information matrix of the loading vehicle;
   identifying an influence line of longitudinal bridge deflection by using Tikhonov regularization method; wherein, an expression of influence line of longitudinal bridge deflection identification is:
   $P=\mathrm{argmin}[\|R-CP\|_2^2+\lambda\|KP\|_2^2]$, wherein P is an influence coefficient vector of influence line of longitudinal bridge deflection, R is a deflection response vector collected by the deflection sensor, C is the information matrix of the loading vehicle, $\lambda$ is a regularization coefficient, and K is a regularization matrix;
   using an interpolation method to fit and obtain an influence line of lateral bridge deflection of small box girder bridges based on the influence line of longitudinal bridge deflection;
   wherein a process of obtaining the influence line of lateral deflection of small box girder bridges comprises:
   obtaining two deflection influence lines at a same lateral position based on a primary longitudinal bridge loading and a secondary longitudinal bridge loading, and obtaining a final longitudinal bridge direction deflection influence line of a current measuring point by averaging the two deflection influence lines;
   averaging respectively influence coefficients of the influence line of longitudinal bridge deflections of two deflection measuring points of a mid-span section and a bearing section of bridges to obtain the influence line of longitudinal bridge deflections of the mid-span section and the bearing section;
   obtaining the influence line of lateral bridge deflection of the small box girder bridges by fitting the influence line of longitudinal bridge deflections of the bearing section, an eighth span section, a quarter-span section and the mid-span section;
   carrying out stiffness evaluation based on the influence line of lateral bridge deflection of the small box girder bridges to obtain a stiffness evaluation result;
   wherein before collecting the deflection value of the measuring point, a layout of the deflection sensor is also comprised, and a layout process of the deflection sensor comprises following steps:

respectively arranging two deflection measuring points on a bottom surface of each small box beam at the mid-span section of the bridges;

arranging one deflection measuring point on a bottom surface of each small box beam at the quarter-span section of the bridges;

arranging one deflection measuring point on a bottom surface of each small box beam at the eighth span section of the bridges;

respectively arranging two deflection measuring points on a bottom surface of each small box beam at the bearing section of the bridge;

arranging a radar speedometer at the quarter span and the mid-span of the bridges at a same time;

a process of collecting data based on a loading process sensor of the loading vehicle comprises:

the loading vehicle moving from one end edge of the bridges to another end edge along the longitudinal bridge direction to complete a longitudinal bridge direction loading;

then a loading position moving to another end along a lateral bridge, and after each movement, the loading position continues to moving along a longitudinal bridge direction until the loading position reaches an edge of the bridge in the longitudinal bridge direction to complete a secondary longitudinal bridge loading;

wherein when the secondary longitudinal bridge loading is completed, readings of the radar speedometer at the quarter span and the mid-span of the bridges are observed when a difference between the readings of speedometers at the quarter span and the mid-span is within 5%, a data collected by the sensor is valid.

2. The method for testing and evaluating lateral stiffness of small box girder bridges according to claim 1, wherein a process of stiffness evaluation comprises:

obtaining a reference influence line based on the influence line of lateral deflection of small box girder bridges fitted for a first time;

conducting a loading test and fitting on a test cross section again after half a year's interval to obtain a current influence line of lateral bridge deflection; and obtaining a deflection influence coefficient difference of each measuring point based on the reference influence line and the current influence line of lateral bridge deflection;

wherein when the difference of deflection influence coefficients on both sides of a fixed abscissa changes plus and minus alternately, the stiffness decreases.

3. The method for testing and evaluating lateral stiffness of small box girder bridges according to claim 2, wherein a criterion for judging a stiffness decrease further comprises the deflection influence line of the current measuring point with a larger change slope at both sides of than rest parts of a stiffness decrease area.

4. The method for testing and evaluating lateral stiffness of small box girder bridges according to claim 2, wherein an expression of the difference of deflection influence coefficient of each measuring point on a cross section is:

$$\begin{cases} \Delta s_1(x_i) = s_1(x_i) - s_1(x_i)_{base}(i = 1, 2, \dots m) \\ \Delta s_2(x_i) = s_1(x_i) - s_1(x_i)_{base}(i = 1, 2, \dots m) \\ \vdots \\ \Delta s_n(x_i) = s_n(x_i) - s_n(x_i)_{base}(i = 1, 2, \dots m) \end{cases},$$

wherein i is a lateral loading point of a same section, m is a number of lateral loading point, $x_i$ is position coordinates of the lateral loading point i of the same section, $s_1(x_i)_{base}$ is an expression of a reference influence line of lateral bridge deflection of a measuring point on a first test section fitted under a first test, $s_1(x_i)$ is an expression of the influence line of lateral bridge deflection of the measuring point on the first test section fitted after half a year, $\Delta s_1(x_i)$ represents a difference function of deflection influence coefficient of the measuring point at different lateral positions on the first test section, and n represents a number of test sections.

\* \* \* \* \*